United States Patent
Green

(10) Patent No.: US 9,251,201 B2
(45) Date of Patent: Feb. 2, 2016

(54) COMPATIBLY EXTENDING OFFLOAD TOKEN SIZE

(71) Applicant: Microsoft Corporation, Redmond, WA (US)

(72) Inventor: Dustin L. Green, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 104 days.

(21) Appl. No.: 13/714,413

(22) Filed: Dec. 14, 2012

(65) Prior Publication Data

US 2014/0172811 A1 Jun. 19, 2014

(51) Int. Cl.
*G06F 17/30* (2006.01)
*H04L 29/08* (2006.01)
*G06F 3/06* (2006.01)
*G06F 21/60* (2013.01)

(52) U.S. Cl.
CPC ........ *G06F 17/30386* (2013.01); *G06F 3/0611* (2013.01); *G06F 3/0655* (2013.01); *G06F 3/0673* (2013.01); *H04L 67/06* (2013.01); *G06F 21/60* (2013.01); *H04L 67/1097* (2013.01)

(58) Field of Classification Search
CPC ..................... G06F 17/30386; G06F 17/30864
USPC ........... 707/705, 716, 781; 709/229; 713/159, 713/172, 181
See application file for complete search history.

(56) References Cited

U.S. PATENT DOCUMENTS

| | | | |
|---|---|---|---|
| 5,043,866 A | 8/1991 | Myre, Jr. | |
| 5,355,477 A | 10/1994 | Strickland | |
| 5,528,594 A * | 6/1996 | Butter et al. | 370/452 |
| 5,668,958 A | 9/1997 | Bendert | |
| 5,678,021 A | 10/1997 | Pawate | |
| 6,141,705 A | 10/2000 | Anand | |
| 6,161,145 A | 12/2000 | Bainbridge | |
| 6,275,867 B1 | 8/2001 | Bendert | |
| 6,304,983 B1 | 10/2001 | Lee | |
| 6,385,701 B1 | 5/2002 | Krein | |
| 6,434,620 B1 | 8/2002 | Boucher et al. | |
| 6,697,881 B2 | 2/2004 | Cochran | |

(Continued)

FOREIGN PATENT DOCUMENTS

| CN | 100343793 C | 10/2007 |
|---|---|---|
| CN | 101278270 A | 10/2008 |

(Continued)

OTHER PUBLICATIONS

LászlóCzap et al., Secure Key Exchange in Wireless Networks, 2011, IEEE, 6 pages.*

(Continued)

*Primary Examiner* — Jean B Fleurantin
(74) *Attorney, Agent, or Firm* — Judy Yee; Sunah Lee; Micky Minhas

(57) ABSTRACT

Aspects of the subject matter described herein relate to offload technology. In aspects, a mechanism is described that allows an offload provider to use larger tokens. The larger token may be physical or virtual. In response to an offload read command, a larger token may be created and data from the larger token may be split or injected into multiple tokens of a smaller size. In response to an offload write command, data from the multiple tokens may be combined into a larger token and/or extracted and used to obtain bulk data.

17 Claims, 9 Drawing Sheets

(56) References Cited

U.S. PATENT DOCUMENTS

| | | |
|---|---|---|
| 6,785,743 B1 | 8/2004 | Sun et al. |
| 7,016,982 B2 | 3/2006 | Basham |
| 7,107,385 B2 | 9/2006 | Rajan |
| 7,275,139 B1 | 9/2007 | Tormasov |
| 7,373,548 B2 | 5/2008 | Reinhardt |
| 7,383,405 B2 | 6/2008 | Vega |
| 7,406,501 B2 | 7/2008 | Szeto |
| 7,475,167 B2 | 1/2009 | Wunderlich et al. |
| 7,475,199 B1 | 1/2009 | Bobbitt |
| 7,565,526 B1 | 7/2009 | Shaw |
| 7,567,985 B1 | 7/2009 | Comay |
| 7,613,786 B2 | 11/2009 | Nakamura |
| 7,633,955 B1 | 12/2009 | Saraiya |
| 7,676,607 B2 | 3/2010 | Jung |
| 7,694,105 B2 | 4/2010 | Sanvido |
| 7,730,034 B1 | 6/2010 | Deflaux |
| 7,730,231 B2 | 6/2010 | Weisser |
| 7,801,852 B2 | 9/2010 | Wong |
| 7,804,862 B1 | 9/2010 | Olson |
| 7,814,058 B2 | 10/2010 | Beck |
| 7,831,720 B1 | 11/2010 | Noureddine |
| 7,886,115 B2 | 2/2011 | Sanvido |
| 7,890,717 B2 | 2/2011 | Tsuboki |
| 7,895,445 B1 | 2/2011 | Albanese |
| 8,042,163 B1 | 10/2011 | Karr et al. |
| 8,082,231 B1 | 12/2011 | McDaniel |
| 8,086,585 B1 | 12/2011 | Brashers |
| 8,213,583 B2 | 7/2012 | Finogenov |
| 8,239,674 B2 | 8/2012 | Lee |
| 8,250,267 B2 | 8/2012 | Logan |
| 8,261,005 B2 | 9/2012 | Flynn |
| 8,261,267 B2 | 9/2012 | Iwamatsu |
| 8,332,370 B2 | 12/2012 | Gattegno |
| 2002/0019788 A1 | 2/2002 | Stehle |
| 2002/0038296 A1 | 3/2002 | Margolus |
| 2002/0178335 A1 | 11/2002 | Selkirk |
| 2002/0198788 A1 | 12/2002 | Moskowitz |
| 2003/0058238 A1 | 3/2003 | Doak |
| 2004/0049603 A1 | 3/2004 | Boyd |
| 2004/0153451 A1 | 8/2004 | Phillips |
| 2004/0205202 A1 | 10/2004 | Nakamura |
| 2004/0267672 A1 | 12/2004 | Gray |
| 2005/0131875 A1 | 6/2005 | Riccardi |
| 2006/0218544 A1 | 9/2006 | Chakraborty |
| 2006/0230222 A1 | 10/2006 | Yamagami |
| 2006/0294234 A1 | 12/2006 | Bakke |
| 2007/0055702 A1 | 3/2007 | Fridella |
| 2007/0260831 A1 | 11/2007 | Michael |
| 2008/0065835 A1 | 3/2008 | Iacobovici |
| 2008/0104039 A1 | 5/2008 | Lowson |
| 2008/0120470 A1 | 5/2008 | Dhamankar |
| 2008/0128484 A1 | 6/2008 | Spaeth |
| 2008/0140910 A1 | 6/2008 | Flynn |
| 2008/0147755 A1 | 6/2008 | Chapman |
| 2008/0155051 A1 | 6/2008 | Moshayedi |
| 2008/0155223 A1 | 6/2008 | Hiltgen |
| 2008/0184273 A1 | 7/2008 | Sekar |
| 2008/0235479 A1 | 9/2008 | Scales |
| 2008/0282337 A1 | 11/2008 | Crawford |
| 2009/0172665 A1 | 7/2009 | Tene |
| 2009/0198731 A1 | 8/2009 | Noonan, III |
| 2009/0248835 A1 | 10/2009 | Panda |
| 2009/0249001 A1 | 10/2009 | Narayanan |
| 2009/0282101 A1 | 11/2009 | Lim |
| 2009/0300301 A1 | 12/2009 | Vaghani |
| 2009/0327621 A1 | 12/2009 | Kliot |
| 2010/0042796 A1 | 2/2010 | Vasilevsky |
| 2010/0070725 A1 | 3/2010 | Prahlad |
| 2010/0083276 A1 | 4/2010 | Green |
| 2010/0094806 A1 | 4/2010 | Apostolides |
| 2010/0115184 A1 | 5/2010 | Chang |
| 2010/0115208 A1 | 5/2010 | Logan |
| 2010/0122248 A1 | 5/2010 | Robinson |
| 2010/0146190 A1 | 6/2010 | Chang |
| 2010/0228913 A1 | 9/2010 | Czezatke |
| 2010/0235831 A1 | 9/2010 | Dittmer |
| 2010/0241785 A1 | 9/2010 | Chen |
| 2010/0250630 A1 | 9/2010 | Kudo |
| 2010/0306467 A1 | 12/2010 | Pruthi |
| 2010/0325441 A1* | 12/2010 | Laurie et al. ............... 713/185 |
| 2011/0055406 A1 | 3/2011 | Piper |
| 2011/0072059 A1 | 3/2011 | Guarraci |
| 2011/0075557 A1 | 3/2011 | Chowdhury et al. |
| 2011/0197022 A1 | 8/2011 | Green |
| 2011/0214172 A1 | 9/2011 | Hermann |
| 2012/0079229 A1 | 3/2012 | Jensen |
| 2012/0079583 A1* | 3/2012 | Christiansen et al. ............ 726/9 |
| 2012/0110281 A1* | 5/2012 | Green et al. ............... 711/154 |
| 2012/0144501 A1 | 6/2012 | Vangpat |
| 2012/0233434 A1 | 9/2012 | Starks et al. |
| 2012/0233682 A1 | 9/2012 | Finogenov |
| 2012/0324560 A1 | 12/2012 | Matthew |
| 2013/0041985 A1 | 2/2013 | Christiansen |
| 2013/0179649 A1 | 7/2013 | Green |
| 2013/0179959 A1 | 7/2013 | Green |
| 2014/0164571 A1 | 6/2014 | Green |

FOREIGN PATENT DOCUMENTS

| | | |
|---|---|---|
| CN | 101622596 A | 1/2010 |
| EP | 2 262 164 A1 | 12/2010 |
| JP | 2010-033206 A | 2/2010 |
| WO | 2008/070811 A2 | 6/2008 |
| WO | 2009/146001 A1 | 12/2009 |
| WO | 2012/039939 A2 | 3/2012 |

OTHER PUBLICATIONS

"Offloaded Data Transfer (ODX) with Intelligent Storage Arrays", Retrieved at <<http://feishare.com/attachments/article/297/windows-offloaded-data-transfer.pdf>>, Feb. 28, 2012, 14 pages.

12/888,433, filed Sep. 23, 2010, Neal R. Christiansen.

12/938,383, filed Nov. 3, 2010, Dustin L. Green.

13/207,014, filed Aug. 10, 2011, Neal R. Christiansen.

13/162,592, filed Jun. 17, 2011, Bryan Matthew.

13/343,718, filed Jan. 5, 2012, Dustin L. Green.

13/345,753, filed Jan. 9, 2012, Dustin L. Green.

PCT International Search Report and Written Opinion for Application No. PCT/US2013/075212, Apr. 25, 2014, all pages.

Walla, "Kerberos Explained", Windows 2000 Advantage magazine, Microsoft TechNet, May 2000, all pages.

"Offloaded Data Transfer (ODX) with Intelligent Storage Arrays", Retrieved at <<http://feishare.com/attachments/article/297/windows-offloaded-data-transfer.pdf, Feb. 28, 2012, pp. 14.

Wu, et al., "Distributed Runtime Load-Balancing for Software Routers on Homogeneous Many-Core Processors", Retrieved at <<http://conferences.sigcomm.org/co-next/2010/Workshops/PRESTO/PRESTO_papers/01-Wu.pdf>>, Proc. of the ACM context workshop on programmable routers for extensible services of tomorrow (PRESTO), Nov. 30, 2011, pp. 6.

"Copy Offload for Disparate Offload Providers", U.S. Appl. No. 13/711,637, filed Dec. 12, 2012, pp. 70.

CN Third Office Action for Application No. 201110343154.7, Mar. 24, 2015.

CN Second Office Action for Application No. 201110343154.7, Sep. 23, 2014.

CN First Office Action for Application No. 201110343154.7, Jan. 22, 2014.

PCT International Search Report and Written Opinion for Application No. PCT/US2013/074509, Mar. 28, 2014.

PCT Written Opinion of the International Preliminary Examining Authority for Application No. PCT/US2013/075212, Oct. 22, 2014.

PCT Notification of Transmittal of the International Preliminary Report on Patentability for Application No. PCT/US2013/075212, Mar. 9, 2015.

AU Patent Examination Report No. 1 for Application No. 2011305839, Apr. 4, 2014.

CN First Office Action for Application No. 201110285468.6, Jan. 30, 2014.

(56) References Cited

OTHER PUBLICATIONS

Agarwal, "Distributed Checkpointing of Virtual Machines in Xen Framework", May 2008.
Campbell, "Hyper-V Scalability Evident in Its New Virtual Disk Format", Jul. 9, 2012.
"ControlSphere Token data structure", as archived on web.archive.org on Jul. 5, 2007.
Microsoft, "Deploying Virtual Hard Disk Images", Jan. 6, 2009.
Elnozahy, "The Performance of Consistent Checkpointing", Proceedings of the 11th Symposium on Reliable Distributed Systems, Oct. 5-7, 1992.
Eshel, "Panache: A Parallel File System Cache for Global File Access", Proceedings of the 8th USENIX Conference on File and Storage Technologies (FAST'10), Feb. 23-26, 2010.
Microsoft, "FSCTL_FILE_LEVEL_TRIM control code", Windows Dev Center, Jul. 19, 2012.
Faulkner, "How to Resize a Microsoft Virtual Hard Drive (VHD) File", How-To Geek, Jul. 26, 2010.
Jarvinen, "Embedded SFE: Offloading Server and Network using Hardware Tokens", Proceedings of the 14th International Conference on Financial Cryptography and Data Security (FC'10), Jan. 25-28, 2010.
Kerr, "Windows With C++: The Virtual Disk API In Windows 7", MSDN Magazine, Apr. 2009.
Leser, "Towards a Worldwide Distributed File System: The OSF DCE File System as an example", DCE Evaluation Team, Open Software Foundation™, Sep. 27, 1990.
Microsoft, "STORAGE_OFFLOAD_TOKEN structure", Hardware Dev Center, originally retrieved Sep. 7, 2011.
Didier Van Hoye, "TRIM/UNMAP Support In Windows Server 2012 & Hyper-V/VHDX", Working Hard in It, May 23, 2012.
VMware, "Troubleshooting parent virtual disk errors in Fusion", Knowledge Base, originally retrieved Feb. 23, 2011.
Microsoft, "Using differencing disks", TechNet, as archived on web.archive.org on Apr. 4, 2011.
Microsoft, "Virtual Hard Disk Image Format Specification", Version 1.0, Oct. 11, 2006.
Lai, "Recovering VMware snapshot after parent changed", edgylogic, Nov. 6, 2007.
Wang, "Cooperative Cache Management in S2FS", Proceedings of the International Conference on Parallel and Distributed Processing Techniques and Applications (PDPTA), Jun. 28-Jul. 1, 1999.
Yang, "Virtual Hard Disk Performance: Windows Server 2008/Windows Server 2008 R2/Windows 7", A Microsoft White Paper, Published: Mar. 2010.
IBM, "Disk cache infrastructure enhancements", IBM Knowledge Center, Jun. 15, 2010.
Sun Microsystems, Inc., "Saving and Restoring ZFS Data: Chapter 6. Working With ZFS Snapshots and Clones", Solaris ZFS Administration Guide, May 2006.
Bandulet, "Object Based Storage Devices", Jul. 2007.
Dean, "Data Movement in Kernelized Systems", Proceedings of the Workshop on Micro-kernels and Other Kernel Architectures, Apr. 27-28, 1992.
Dell, "Auto-Snapshot Manager/VMware Edition: Automated, Integrated, and Scalable Protection of Virtual Machines", 2009.
Lachaize, "A Distributed Shared Buffer Space for Data-intensive Applications", vol. 2, Proceedings of the 5th International Symposium on Cluster Computing and the Grid (CCGrid 2005), May 9-12, 2005.
Narayanan, "Write Off-Loading: Practical Power Management for Enterprise Storage", Proceedings of the 6th USENIX Conference on File and Storage Technologies (FAST'08), Feb. 26-29, 2008.
Wang, "A computation offloading scheme on handheld devices", Journal of Parallel Distributed Computing, Elsevier, Jun. 2004.
PCT International Search Report and Written Opinion for Application No. PCT/US2011/050739, Apr. 9, 2012.
"What pv technology means in vSphere", Jan. 30, 2010.
Devulapalli, "Design of an Intelligent Object-based Storage device", originally retrieved Jul. 5, 2010.
CN Second Office Action for Application No. 201110285468.6, Sep. 30, 2014.
AU Patent Examination Report No. 2 for Application No. 2011305839, Jul. 2, 2014.
JP Notice of Rejection for Application No. 2013-530171, Apr. 16, 2015.
EP Communication for Application No. 12821531.6, Feb. 13, 2015.
PCT International Search Report and Written Opinion for Application No. PCT/US2012/047261, Jan. 31, 2013.

* cited by examiner

COMPATIBLY EXTENDING OFFLOAD TOKEN SIZE

BACKGROUND

One mechanism for transferring data is to read the data from a file of a source location into main memory and write the data from the main memory to a destination location. While in some environments, this may work acceptably for relatively little data, as the data increases, the time it takes to read the data and transfer the data to another location increases. In addition, if the data is accessed over a network, the network may impose additional delays in transferring the data from the source location to the destination location. Furthermore, security issues combined with the complexity of storage arrangements may complicate data transfer.

The subject matter claimed herein is not limited to embodiments that solve any disadvantages or that operate only in environments such as those described above. Rather, this background is only provided to illustrate one exemplary technology area where some embodiments described herein may be practiced.

SUMMARY

Briefly, aspects of the subject matter described herein relate to offload technology. In aspects, a mechanism is described that allows an offload provider to use larger tokens. The larger token may be physical or virtual. In response to an offload read command, a larger token may be created and data from the larger token may be split or injected into multiple tokens of a smaller size. In response to an offload write command, data from the multiple tokens may be combined into a larger token and/or extracted and used to obtain bulk data.

This Summary is provided to briefly identify some aspects of the subject matter that is further described below in the Detailed Description. This Summary is not intended to identify key or essential features of the claimed subject matter, nor is it intended to be used to limit the scope of the claimed subject matter.

The phrase "subject matter described herein" refers to subject matter described in the Detailed Description unless the context clearly indicates otherwise. The term "aspects" should be read as "at least one aspect." Identifying aspects of the subject matter described in the Detailed Description is not intended to identify key or essential features of the claimed subject matter.

The aspects described above and other aspects of the subject matter described herein are illustrated by way of example and not limited in the accompanying figures in which like reference numerals indicate similar elements and in which:

DETAILED DESCRIPTION

Definitions

The phrase "subject matter described herein" refers to subject matter described in the Detailed Description unless the context clearly indicates otherwise. The term "aspects" should be read as "at least one aspect." Identifying aspects of the subject matter described in the Detailed Description is not intended to identify key or essential features of the claimed subject matter.

As used herein, the term "includes" and its variants are to be read as open-ended terms that mean "includes, but is not limited to." The term "or" is to be read as "and/or" unless the context clearly dictates otherwise. The term "based on" is to be read as "based at least in part on." The terms "one embodiment" and "an embodiment" are to be read as "at least one embodiment." The term "another embodiment" is to be read as "at least one other embodiment."

As used herein, terms such as "a," "an," and "the" are inclusive of one or more of the indicated item or action. In particular, in the claims a reference to an item generally means at least one such item is present and a reference to an action means at least one instance of the action is performed.

Sometimes herein the terms "first", "second", "third" and so forth may be used. Without additional context, the use of these terms in the claims is not intended to imply an ordering but is rather used for identification purposes. For example, the phrases "first version" and "second version" do not necessarily mean that the first version is the very first version or was created before the second version or even that the first version is requested or operated on before the second version. Rather, these phrases are used to identify different versions.

Headings are for convenience only; information on a given topic may be found outside the section whose heading indicates that topic.

Other definitions, explicit and implicit, may be included below.

Exemplary Operating Environment

Figure 1:
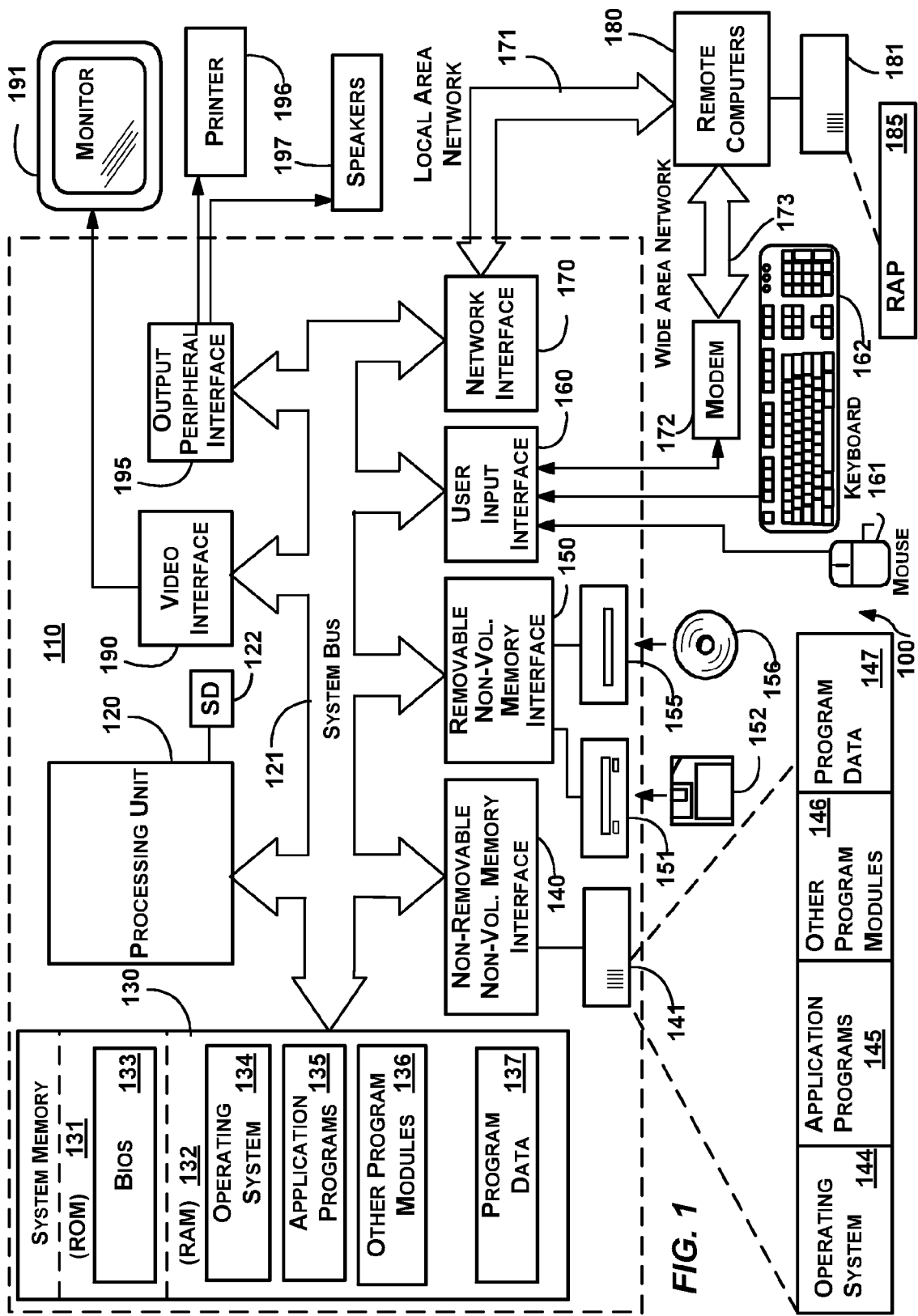
FIG. 1 is a block diagram representing an exemplary general-purpose computing environment into which aspects of the subject matter described herein may be incorporated.

FIG. 1 illustrates an example of a suitable computing system environment 100 on which aspects of the subject matter described herein may be implemented. The computing system environment 100 is only one example of a suitable computing environment and is not intended to suggest any limitation as to the scope of use or functionality of aspects of the subject matter described herein. Neither should the computing environment 100 be interpreted as having any dependency or requirement relating to any one or combination of components illustrated in the exemplary operating environment 100.

Aspects of the subject matter described herein are operational with numerous other general purpose or special purpose computing system environments or configurations. Examples of well-known computing systems, environments, or configurations that may be suitable for use with aspects of the subject matter described herein comprise personal computers, server computers—whether on bare metal or as virtual machines—, hand-held or laptop devices, multiprocessor systems, microcontroller-based systems, set-top boxes, programmable and non-programmable consumer electronics, network PCs, minicomputers, mainframe computers, personal digital assistants (PDAs), gaming devices, printers, appliances including set-top, media center, or other appliances, automobile-embedded or attached computing devices, other mobile devices, phone devices including cell phones, wireless phones, and wired phones, distributed computing environments that include any of the above systems or devices, and the like.

Aspects of the subject matter described herein may be described in the general context of computer-executable instructions, such as program modules, being executed by a computer. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

Alternatively, or in addition, the functionality described herein may be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), and the like.

With reference to FIG. 1, an exemplary system for implementing aspects of the subject matter described herein includes a general-purpose computing device in the form of a computer 110. A computer may include any electronic device that is capable of executing an instruction. Components of the computer 110 may include a processing unit 120, a system memory 130, and one or more system buses (represented by system bus 121) that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus also known as Mezzanine bus, Peripheral Component Interconnect Extended (PCI-X) bus, Advanced Graphics Port (AGP), and PCI express (PCIe).

The processing unit 120 may be connected to a hardware security device 122. The security device 122 may store and be able to generate cryptographic keys that may be used to secure various aspects of the computer 110. In one embodiment, the security device 122 may comprise a Trusted Platform Module (TPM) chip, TPM Security Device, or the like.

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media.

Computer storage media includes both volatile and nonvolatile, removable and non-removable media implemented in any method or technology for storage of information such as computer-readable instructions, data structures, program modules, or other data. Computer storage media includes RAM, ROM, EEPROM, solid state storage, flash memory or other memory technology, CD-ROM, digital versatile discs (DVDs) or other optical disk storage, magnetic cassettes, magnetic tape, magnetic disk storage or other magnetic storage devices, or any other medium which can be used to store the desired information and which can be accessed by the computer 110. Computer storage media does not include communication media.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct wired connection, and wireless media such as acoustic, RF, infrared and other wireless media. Combinations of any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disc drive 155 that reads from or writes to a removable, nonvolatile optical disc 156 such as a CD ROM, DVD, or other optical media. Other removable/non-removable, volatile/nonvolatile computer storage media that can be used in the exemplary operating environment include magnetic tape cassettes, flash memory cards and other solid state storage devices, digital versatile discs, other optical discs, digital video tape, solid state RAM, solid state ROM, and the like. The hard disk drive 141 may be connected to the system bus 121 through the interface 140, and magnetic disk drive 151 and optical disc drive 155 may be connected to the system bus 121 by an interface for removable nonvolatile memory such as the interface 150.

The drives and their associated computer storage media, discussed above and illustrated in FIG. 1, provide storage of computer-readable instructions, data structures, program modules, and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies.

A user may enter commands and information into the computer 110 through input devices such as a keyboard 162 and pointing device 161, commonly referred to as a mouse, trackball, or touch pad. Other input devices (not shown) may include a microphone (e.g., for inputting voice or other audio), joystick, game pad, satellite dish, scanner, a touch-sensitive screen, a writing tablet, a camera (e.g., for inputting gestures or other visual input), or the like. These and other input devices are often connected to the processing unit 120 through a user input interface 160 that is coupled to the system bus, but may be connected by other interface and bus structures, such as a parallel port, game port or a universal serial bus (USB).

Through the use of one or more of the above-identified input devices a Natural User Interface (NUI) may be established. A NUI, may rely on speech recognition, touch and stylus recognition, gesture recognition both on screen and adjacent to the screen, air gestures, head and eye tracking, voice and speech, vision, touch, gestures, machine intelligence, and the like. Some exemplary NUI technology that may be employed to interact with a user include touch sensitive displays, voice and speech recognition, intention and goal understanding, motion gesture detection using depth cameras (such as stereoscopic camera systems, infrared camera systems, RGB camera systems, and combinations thereof), motion gesture detection using accelerometers/gyroscopes, facial recognition, 3D displays, head, eye, and gaze tracking, immersive augmented reality and virtual reality systems, as well as technologies for sensing brain activity using electric field sensing electrodes (EEG and related methods).

A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include phone networks, near field networks, and other networks. Such networking environments are commonplace in offices, enterprise-wide computer networks, intranets, and the Internet.

When used in a LAN networking environment, the computer 110 is connected to the LAN 171 through a network interface or adapter 170. When used in a WAN networking environment, the computer 110 may include a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Offload Reads and Writes

As mentioned previously, some traditional data transfer operations may not be efficient or even work in today's storage environments.

FIGS. 2-4 and 6 are block diagrams that represent exemplary arrangements of components of systems in which aspects of the subject matter described herein may operate. The components illustrated in FIGS. 2-4 and 6 are exemplary and are not meant to be all-inclusive of components that may be needed or included. In other embodiments, the components and/or functions described in conjunction with FIGS. 2-4 and 6 may be included in other components (shown or not shown) or placed in subcomponents without departing from the spirit or scope of aspects of the subject matter described herein. In some embodiments, the components and/or functions described in conjunction with FIGS. 2-4 and 6 may be distributed across multiple devices.

Figure 2:
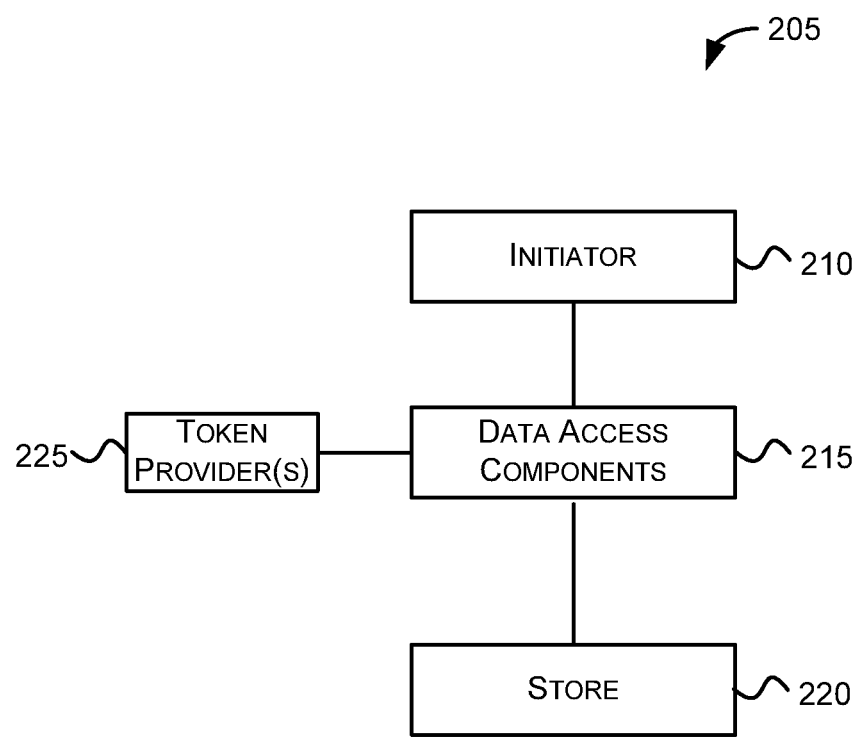
FIGS. 2-4 are block diagrams that represent exemplary arrangements of components of systems in which aspects of the subject matter described herein may operate.

Turning to FIG. 2, the system 205 may include an initiator 210, data access components 215, token provider(s) 225, a store 220, and other components (not shown). The system 205 may be implemented via one or more computing devices. Such devices may include, for example, personal computers, server computers, hand-held or laptop devices, multiprocessor systems, microcontroller-based systems, set-top boxes, programmable consumer electronics, network PCs, minicomputers, mainframe computers, cell phones, personal digital assistants (PDAs), gaming devices, printers, appliances including set-top, media center, or other appliances, automobile-embedded or attached computing devices, other mobile devices, distributed computing environments that include any of the above systems or devices, and the like.

Where the system 205 comprises a single device, an exemplary device that may be configured to act as the system 205 comprises the computer 110 of FIG. 1. Where the system 205 comprises multiple devices, one or more of the multiple devices may comprise the computer 110 of FIG. 1 where the multiple devices may be configured similarly or differently.

The data access components 215 may be used to transmit data to and from the store 220. The data access components 215 may include, for example, one or more of: I/O managers, filters, drivers, file server components, components on a storage area network (SAN) or other storage device, and other components (not shown). As used herein, a SAN may be implemented, for example, as a device that exposes logical storage targets, as a communication network that includes such devices, or the like.

In one embodiment, a data access component may comprise any component that is given an opportunity to examine I/O between the initiator 210 and the store 220 and that is capable of changing, completing, or failing the I/O or performing other or no actions based thereon. For example, where the system 205 resides on a single device, the data access components 215 may include any object in an I/O stack between the initiator 210 and the store 220. Where the system 205 is implemented by multiple devices, the data access components 215 may include components on a device that hosts the initiator 210, components on a device that provides access to the store 220, and/or components on other devices and the like. In another embodiment, the data access components 215 may include any components (e.g., such as a service, database, or the like) used by a component through which the I/O passes even if the data does not flow through the used components.

As used herein, the term component is to be read to include hardware such as all or a portion of a device, a collection of one or more software modules or portions thereof, some combination of one or more software modules or portions thereof and one or more devices or portions thereof, and the like. A component may include or be represented by code.

As used herein, the term computer code is to be read to include instructions that dictate actions a computer is to take. These instructions may be included in any computer-readable media volatile or nonvolatile.

In one embodiment, the store 220 is any storage media capable of storing data. The store 220 may include volatile memory (e.g., a cache) and nonvolatile memory (e.g., a persistent storage). The term data is to be read broadly to include anything that may be represented by one or more computer storage elements. Logically, data may be represented as a series of 1's and 0's in volatile or nonvolatile memory. In computers that have a non-binary storage medium, data may be represented according to the capabilities of the storage medium. Data may be organized into different types of data structures including simple data types such as numbers, letters, and the like, hierarchical, linked, or other related data types, data structures that include multiple other data structures or simple data types, and the like. Some examples of data include information, program code, program state, program data, commands, other data, or the like.

The store 220 may comprise hard disk storage, solid state, or other nonvolatile storage, volatile memory such as RAM, other storage, some combination of the above, and the like and may be distributed across multiple devices (e.g., multiple SANs, multiple file servers, a combination of heterogeneous devices, and the like). The devices used to implement the store 220 may be located physically together (e.g., on a single device, at a datacenter, or the like) or distributed geographically. The store 220 may be arranged in a tiered storage arrangement or a non-tiered storage arrangement. The store 220 may be external, internal, or include components that are both internal and external to one or more devices that implement the system 205. The store 220 may be formatted (e.g., with a file system) or non-formatted (e.g., raw).

In another embodiment, the store 220 may be implemented as a storage container rather than as direct physical storage. A storage container may include, for example, a file, volume, disk, virtual disk, logical unit, logical disk, writable clone, volume snapshot, logical disk snapshot, physical disk, solid state storage (SSD), hard disk, data stream, alternate data stream, metadata stream, or the like. For example, the store 220 may be implemented by a server having multiple physical storage devices. In this example, the server may present an interface that allows a data access component to access data of a store that is implemented using one or more of the physical storage devices or portions thereof of the server.

The level of abstraction may be repeated to any arbitrary depth. For example, the server providing a storage container to the data access components 215 may also rely on a storage container to access data.

In another embodiment, the store 220 may include a component that provides a view into data that may be persisted in nonvolatile storage or not persisted in nonvolatile storage.

Figure 3:
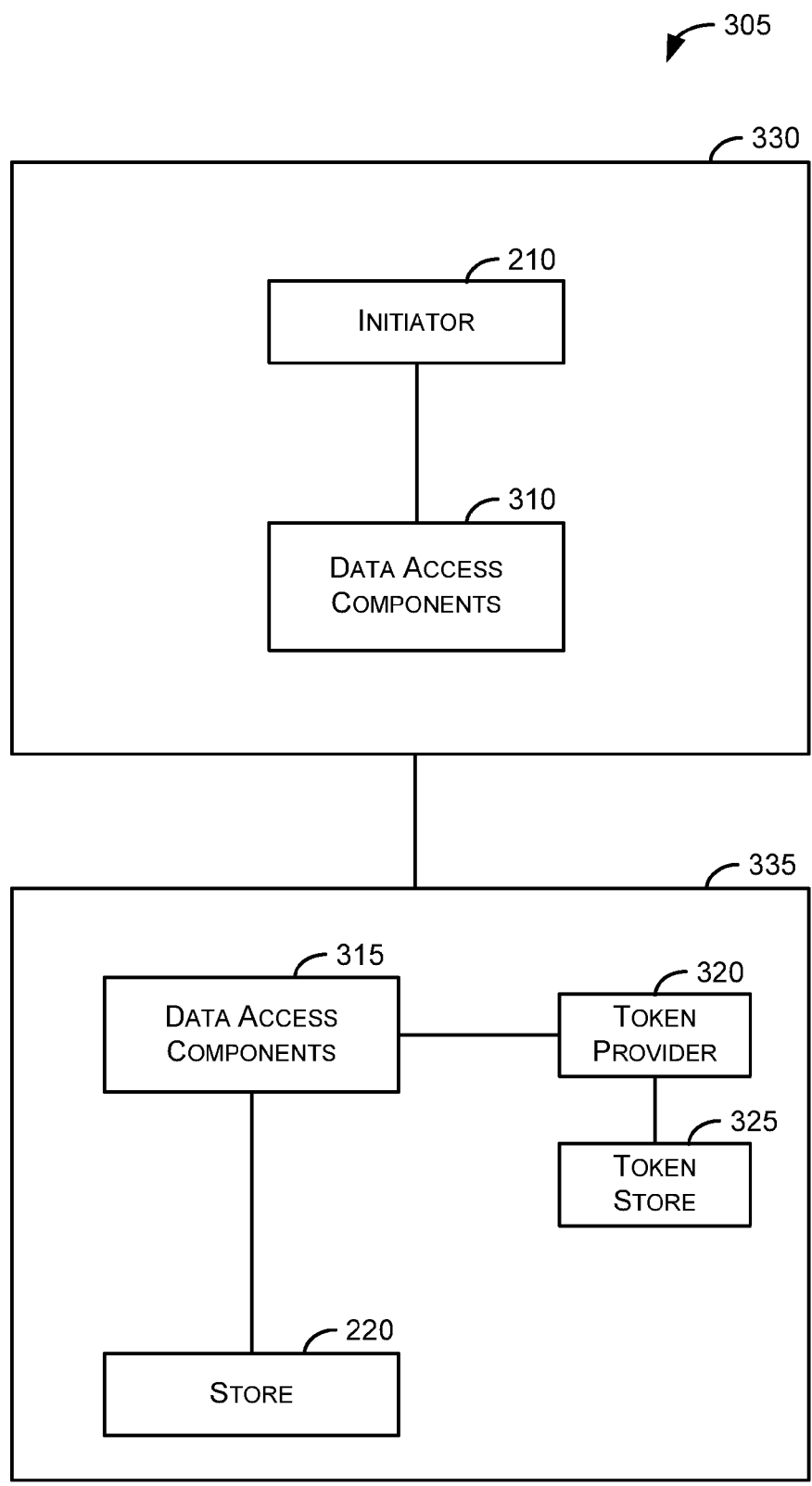

One or more of the data access components 215 may reside on an apparatus that hosts the initiator 210 while one or more other of the data access components 215 may reside on an apparatus that hosts or provides access to the store 220. For example, if the initiator 210 is an application that executes on a personal computer, one or more of the data access components 215 may reside in an operating system hosted on the personal computer. An example of this is illustrated in FIG. 3.

As another example, if the store 220 is implemented by a storage area network (SAN), one or more of the data access components 215 may implement a storage operating system that manages and/or provides access to the store 220. When the initiator 210 and the store 220 are hosted in a single apparatus, all or many of the data access components 215 may also reside on the apparatus.

An offload read allows an initiator to obtain a token that represents data of a store. Using this token, the initiator or another initiator may request an offload write. An offload write allows an initiator to cause an offload provider to write some or all of the data represented by the token.

In one embodiment, a token includes a cryptographically secure number that is obtained via a successful offload read. At the present time, one example of a cryptographically secure number is a 256 bit number generated in an appropriate way (e.g., via creating a random number by sampling some random physical phenomena). Some exemplary procedures for generating cryptographically secure numbers are described in Request for Comments (RFC) 1750. With advances in technology both the length of the secure number and the procedure used to generate a cryptographically secure number may change without departing from the spirit or scope of aspects of the subject matter described herein.

A token represents data that is immutable as long as the token is valid. The data a token represents is sometimes referred to as bulk data.

An offload provider is an entity (possibly including multiple components spread across multiple devices) that provides indirect access to data associated with a token. Logically, an offload provider is capable of performing an offload read and/or offload write. Physically, an offload provider may be implemented by one or more of the data access components 215 and a token provider.

In servicing an offload read or offload write, an offload provider may logically perform operations on the data of the store and/or on tokens associated with a token provider. For example, for an offload read, an offload provider may logically copy data from a logical storage container backed by data of a store into a token (which may also be backed by data of the store), while for an offload write, the offload provider may logically copy data from a token to a logical storage container backed by data of the store.

An offload provider may transfer data from a source store, write data to a destination store, and maintain data to be provided upon receipt of a token associated with the data. In some implementations, an offload provider may indicate that an offload write command is completed after the data has been logically written to the destination store. In addition, an offload provider may indicate that an offload write command is completed but defer physically writing data associated with the offload write until convenient.

In some implementations, an offload provider may share data between a first logical storage container and a second logical storage container, and may share data between a token and a storage container. The offload provider may stop sharing data as part of performing a write to physical storage locations of the store which would otherwise cause more than one storage container to be modified, or would otherwise cause the data represented by a token to change.

In some implementations, an offload provider may perform a logical copy from a storage container to a token or a logical copy from a token to a storage container by initiating sharing of data between a token and a storage container. For example, the offload provider may perform an offload read by logically copying the data from the source storage container to the token by initiating sharing of data between the source storage container and the token. In another example, the offload provider may perform an offload write by logically copying the data from the token to the destination storage container by initiating sharing of data between the token and the destination storage container.

In some implementations, an offload provider may invalidate a token to, for example, avoid sharing data and/or avoid physically copying data. For example, the offload provider may perform an offload write by logically copying data from the token to the destination storage container by updating the data structures of the destination storage container to refer to the physical storage locations of the store referenced by the token, and in conjunction therewith, logically invalidate at least a portion of the token. Note that this may still result in the source and destination storage containers sharing data.

In some implementations, an offload provider may initiate sharing of data storage locations among all tokens and storage containers already sharing the data, and in addition, another storage container or token. For example, to service an offload read, an offload provider may initiate sharing between a source storage container and a token. Then, to service an offload write using the token, the offload provider may initiate sharing among the source storage container, the token, and the destination storage container. If the token is later invalidated, sharing with the token is stopped, but the sharing between source and destination storage containers may continue (e.g., until a write is received that is directed at that data).

As used herein, in one implementation, a token provider is part of an offload provider. In this implementation, where a token provider is described as performing actions, it is to be understood that the offload provider that includes the token provider is performing those actions. In another implementation, a token provider may be separate from the offload provider.

To initiate an offload read of data of the store 220, the initiator 210 may send a request to obtain a token representing the data using a predefined command (e.g., via an API). In response, one or more of the data access components 215 may respond to the initiator 210 by providing one or more tokens that represents the data or a subset thereof. A token may be represented by a sequence of bytes which are used to represent immutable data. The size of the immutable data may be larger, smaller, or the same size as the token.

With a token, the initiator 210 may request that all or portions of the data represented by the token be logically written. Sometimes herein this operation is called an offload write. The initiator 210 may do this by sending the token together with one or more offsets and lengths to the data access components 215.

The data access components 215 may be implemented as a storage stack where each layer of the stack may perform a different function. For example, the data access components may partition data, split offload read or write requests, cache data, verify data, snapshot data, and the like.

One or more layers of the stack may be associated with a token provider. A token provider may include one or more components that may generate or obtain tokens that represent portions of the data of the store 220 and provide these tokens to an initiator.

For a portion of an offload write, for a token involved, a token-relative offset may be indicated as well as a destination-relative offset. Either or both offsets may be implicit or explicit. A token-relative offset may represent a number of bytes (or other units) from the beginning of data represented by the token, for example. A destination-relative offset may represent the number of bytes (or other units) from the beginning of data on the destination. A length may indicate a number of bytes (or other units) starting at the offset.

If a data access component 215 fails an offload read or write, an error code may be returned that allows another data access component or the initiator to attempt another mechanism for reading or writing the data.

FIG. 3 is a block diagram that generally represents an exemplary arrangement of components of systems in which a token provider is hosted by the device that hosts the store. As illustrated, the system 305 includes the initiator 210 and the store 220 of FIG. 2. The data access components 215 of FIG. 3 are divided between the data access components 310 that reside on the device 330 that hosts the initiator 210 and the data access components 315 that reside on the device 335 that hosts the store 220. In another embodiment, where the store 220 is external to the device 335, there may be additional data access components that provide access to the store 220.

The device 335 may be considered to be one example of an offload provider as this device includes components for performing offload reads and writes and managing tokens.

The token provider 320 may generate, validate, and invalidate tokens. For example, when the initiator 210 asks for a token for data on the store 220, the token provider 320 may generate a token that represents the data. This token may then be sent back to the initiator 210 via the data access components 310 and 315.

In conjunction with generating a token, the token provider 320 may create an entry in the token store 325. This entry may associate the token with data that indicates where on the store 220 the data represented by the token may be found. The entry may also include other data used in managing the token such as when to invalidate the token, a time to live for the token, other data, and the like.

When the initiator 210 or any other entity provides the token to the token provider 320, the token provider 320 may perform a lookup in the token store 325 to determine whether the token exists. If the token exists and is valid, the token provider 320 may provide location information to the data access components 315 so that these components may logically read or write or logically perform other operations with the data as requested.

In another exemplary arrangement similar to FIG. 3, the token provider 320 and token store 325 may be included in the device 330, and the data access components 310 connected to token provider 320. For example, an operating system (OS) of the device 330 may include the token provider 320 and the token store 325. In this example, the initiator 210 may assume the existence of a token provider and token store for all copying performed by the initiator 210. With this assumption, the initiator 210 may be implemented to omit code that falls back to normal read and write.

In the example above, the OS may implement offload read by logically reading the requested data from the data access components 315 and storing the data in storage (volatile or non-volatile) of device 330, creating a new token value, and associating the newly created token value with the read data. The OS may implement offload write by copying (e.g., logically writing) the data associated with the token to the destination specified by initiator 210. In this example, the initiator 210 may need to re-attempt a copy at the offload read step in some scenarios, but this re-attempt may be less burdensome for the initiator than falling back to normal read and write.

Figure 4:
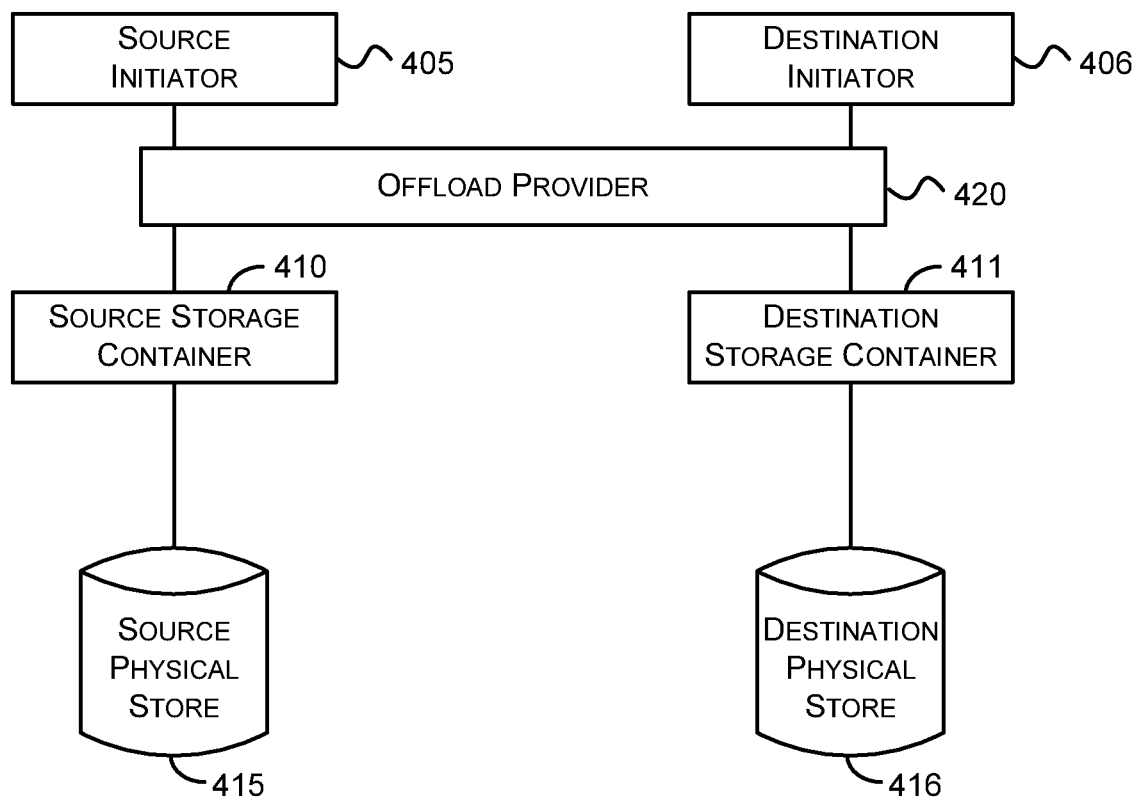

FIG. 4 is a block diagram that generally represents another exemplary environment in which aspects of the subject matter described herein may be implemented. As illustrated, the environment includes a source initiator 405, a destination initiator 406, a source storage container 410, a destination storage container 411, a source physical store 415, a destination physical store 416, an offload provider 420, and may include other components (not shown).

The source initiator 405 and the destination initiator may be implemented similarly to the initiator 210 of FIG. 2. The source initiator 405 and the destination initiator 406 may be two separate entities or a single entity.

If the source storage container 410 and the destination storage container 411 are implemented by a single system, the offload provider 420 may be implemented as one or more components of the system implementing the storage containers. If the source storage container 410 and the destination storage container 411 are implemented by different systems, the offload provider 420 may be implemented as one or more components that are distributed across the systems implementing the storage containers.

Furthermore, there may be more than two instances of storage containers and physical stores. For example, for a given token obtained from a source, there may be more than one destination specified. For example, multiple offload writes may be issued which refer to a single token, and each offload write may successfully target any destination known to the offload provider 420.

The source physical store 415 and the destination physical store 416 may be the same store or different stores. These physical stores store physical data that backs the source and destination storage containers, and may also back the data represented by the tokens.

Although illustrated as only having one storage container between the initiator and the physical store, as mentioned previously, in other embodiments there may be multiple layers of storage containers between the initiator and the physical store.

The source initiator 405 may obtain a token by issuing an offload read. In response, the offload provider 420 may generate a token and provide it to the source initiator 405.

If the source initiator 405 and the destination initiator 406 are separate entities, the source initiator 405 may provide the token to the destination initiator 406. The destination initiator 406 may then use the token to issue an offload write to the destination storage container 411.

In receiving the offload write request, the offload provider 420 may validate the token and logically write data to the destination storage container 411 as indicated by the offload write request.

Extending Token Size

With offload technology, a standard or industry may dictate a certain fixed size of the token. For various reasons, some implementers may desire a size that is larger than the standardized fixed size.

To accommodate larger sized tokens, the standard may be modified to allow multiple tokens. A token larger than the fixed size may then be represented by multiple smaller subtokens of the fixed size. For example, one standard requires a token to be 512 bytes. In an implementation for this standard, the subtokens may each be exactly 512 bytes while the larger token may be larger than 512 bytes (e.g. 995, 2000, 4096, or some other number of bytes).

Figure 5:
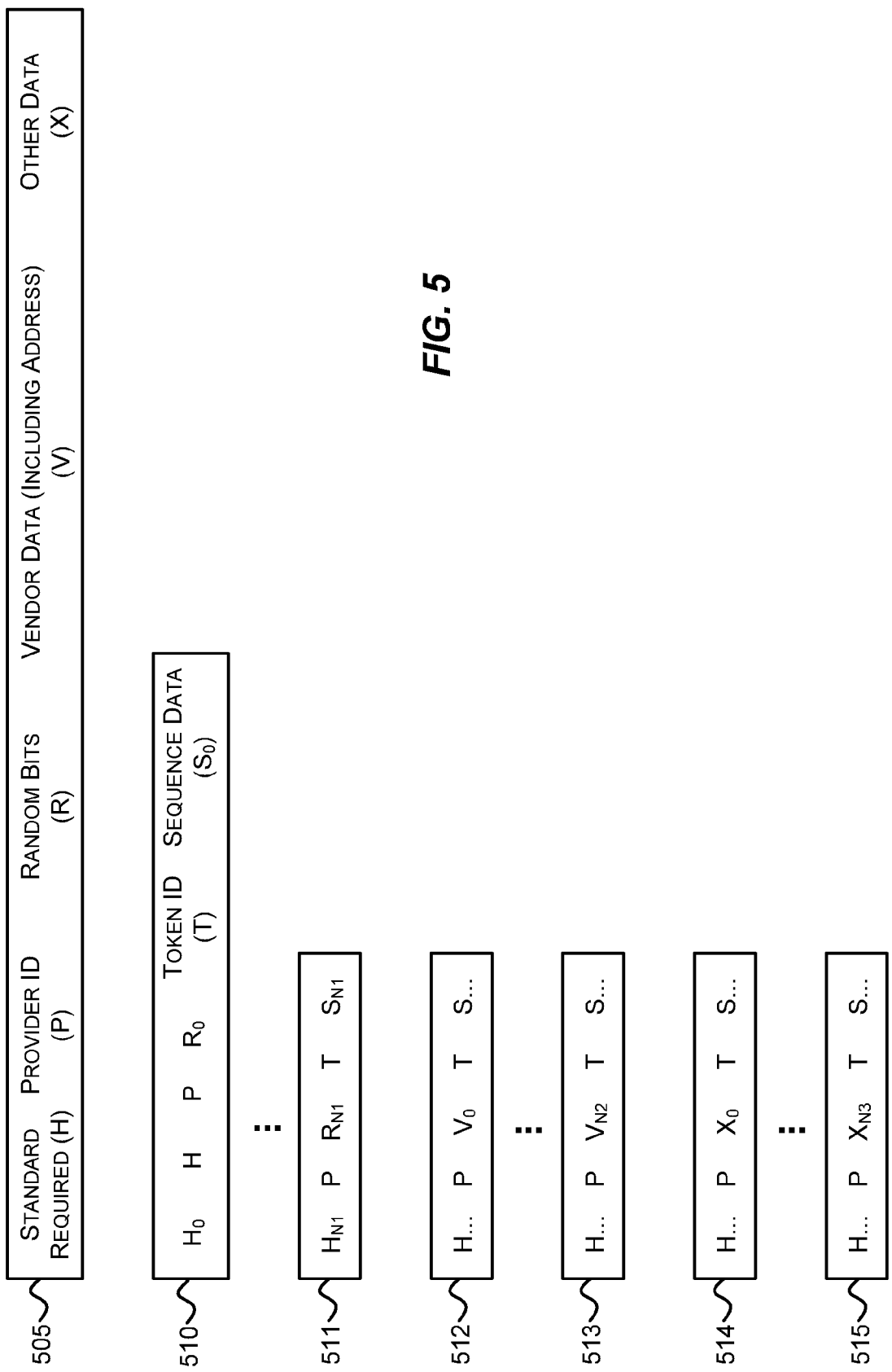
FIG. 5 is a diagram that illustrates one exemplary scheme for representing one larger token with one or more smaller subtokens in accordance with aspects of the subject matter described herein.

FIG. 5 is a diagram that illustrates one exemplary scheme for representing one larger token with one or more smaller subtokens in accordance with aspects of the subject matter described herein. As illustrated, an exemplary large token 505 may have standard required fields H, a provider ID P, random data R, vendor data V, and other data X.

The standard required field H may include any fields required or otherwise specified by a standard. For example, the standard required fields H may include one or more of: data that indicates when a token was generated, data that indicates when the token is supposed to expire, data that indicates where a token came from, or other data specified by a standard.

The provider ID P may indicate an instance of an offload provider that generated the token. The provider ID P may be used in a threshold test to determine whether the token is to be ignored or not. If the provider ID P is not a provider ID that would have been provided by the offload provider, the offload provider may reject the token altogether. Otherwise, the offload provider may take additional actions to validate the token.

The vendor data V may include any data that a vendor implementing an offload provider may desire. As one example, a vendor may include addressing information that indicates an address of an offload provider that provided the token 505. As other examples, the vendor data V may include a hash key, a digest, a lookup key, metadata, data related to the bulk data, data the helps identify or locate portions of the bulk data, other data, or the like.

The other data X may include any other data that is included in the token 505.

The subtokens may be transmitted via virtually any protocol. For example, in one example, the subtokens may be transmitted via a Small Computer System Interface (SCSI) protocol. In another example, the subtokens may be transmitted via a file sharing protocol that transfers file data via server message blocks. One exemplary file sharing protocol includes the Server Message Block (SMB) protocol. In another example, the subtokens may be transmitted via a distributed file system protocol that is based on remote procedure calls to access files. One example protocol based on remote procedure calls includes the Network File System (NFS) protocol.

The examples above are not intended to be all-inclusive or exhaustive of protocols that may be used. Indeed, based on the teachings herein, those skilled in the art may recognize many other protocols that may be used without departing from the spirit or scope of aspects of the subject matter described herein.

The subtokens 510-515 may be tokens of a fixed size (e.g., dictated by standard) that represent the token 505. The subtokens 510-515 may include various fields. For example, a subtoken may include fields ($H_0$, $H_{N1}$, H . . . ) required by a standard, a provider ID field (P), a token ID (T), sequence data ($S_0$, $S_{N1}$, S . . . ), a number that indicates how many subtokens represent the token 505, and data corresponding to the data of the token 505. This other data is represented by H, $R_0$ to $R_{N1}$, $V_0$ to $V_{N2}$, and $X_0$ to $X_{N3}$, where H corresponds to the standard required fields H in the token 505, $R_0$ to $R_{N1}$ correspond to the random data R in the token 505, $V_0$ to $V_{N2}$ correspond to the vendor data V in the token 505, and $X_0$ to $X_{N3}$ correspond to the other data X in the token 505.

The fields ($H_0$, $H_{N1}$, H . . . ) may include any data required or otherwise specified by a standard. This may include, for example, header or other fields specified by any version of the SCSI protocol. The fields ($H_0$, $H_{N1}$, H . . . ) may occur prior to and/or after any other fields indicated in FIG. 5.

Where the SCSI protocol is used, the fields ($H_0$, $H_{N1}$, H . . . ) may include, for example, header or other fields specified by any version of the SCSI protocol. Some exemplary fields include: timestamp of token creation, token type (e.g., point in time copy), address of source, data identifying a representation of data token type, data that identifies each of the subtokens as a token for transferring bulk data without requiring the bulk data to pass through an initiator of a command that requested the transferring, other fields specified by the SCSI protocol, or the like.

Where other protocols are used, the fields ($H_0$, $H_{N1}$, H . . . ) may include, for example, fields required or allowed by those protocols. In one implementation, the fields ($H_0$, $H_{N1}$, H . . . ) may be omitted altogether.

In some implementations, the fields ($H_0$, $H_{N1}$, H . . . ) may also include, for example, types of data indicated above with respect to the standard required fields H of the token 505.

The provider ID P may indicate an instance of an offload provider that generated the token and may be used in the same manner as indicated above.

The token ID T may be data that identifies a subtoken as belonging to a group of subtokens that represent a larger token. For example, a token ID of "ABCD" in each of the T fields of the subtokens 510-515 may identify the subtokens 510-515 as belonging to a group of subtokens that represent the token 505. If a subtoken has a different token ID, the offload provider may determine that the subtoken is not part of the group of subtokens that represent the token 505.

The sequence data ($S_0$, $S_{N1}$, S . . . ) may include data that indicates an ordering of the subtokens. For example, the sequence data may include an increasing number (e.g., 1, 2, 3, 4, etc.) that indicates an order of the subtokens. The order may be used to combine the subtokens 510-515 to reconstruct the token 505 or portions thereof.

In one implementation, data from the fields of the subtokens 510-515 may be combined to construct all the data included in the token 505. For example, in this implementation, the combined data of the subtokens 510-515 may include at least the data included in the token 505.

In another implementation, the subtokens 510-515 do not include all the data that is included in the token 505. For example, the subtokens 510-515 may include enough data to identify (e.g., through a lookup table or other data structure) data in the token 505. For example, the subtokens 510-515 may be combined to obtain R and address information. R and the address information may then be used by an offload provider to look up the other information included in the token 505.

In another example, one or more of the subtokens 510-515 may include data that may be used to map to the random data R. In this example, the random data R cannot be reconstructed from the data found solely in the subtokens 510-515, but the random data R may be found (e.g., in a lookup table) from the random data included in one or more of the subtokens 510-515. In this example, other data (e.g., the address data of the token 505) may be included in one or more of the subtokens 510-515. The address data may then be used to locate a mapping table, for example, that may be used to locate the other data included the token 505.

A similar mechanism may also be used to find other omitted data that is not physically found in the subtokens 510-515 but that may be found using data that maps to the omitted data.

In one example, one of the subtokens (sometimes referred to herein as the master subtoken) may include all of the random data R while the other subtokens may not include any data that corresponds to the random data R. In another example, the subtokens 510-515 may each include data that corresponds to the random data R.

Various mechanisms may be used to validate the token 505. In one example, after the token 505 is reconstructed from the subtokens 510-515, a bitwise comparison is performed to determine whether the token 505 is exactly a token generated by the offload provider. If the bits in the token equal the bits found for a token having R in the token store, the token 505 may be determined to be valid.

In another example, a digest of the token 505 may be computed and the digest may be compared to digests of tokens generated by the offload provider. In this example, a digest may be selected that has a low or no possibility of colliding with other digests. In this example, if the digest is equal to a digest of a token generated by the offload provider, the token 505 may be determined to be valid.

In another example, the token 505 may be determined to be valid if R is equal to an R of a token stored by the offload provider.

In one implementation, the larger token 505 is a token that is provided and actually exists and is implemented as one or more data structures. The larger token 505 may be physically divided into the multiple subtokens 510 which may also be recombined to form the larger token 505.

In another implementation, the larger token 505 comprises a virtual offload token that logically includes the fields illustrated for the token 505, but where all the fields may not actually be in the same data structure. In this implementation, the token 505 does not go through a period where a single chunk of data includes all the fields of the token 505. Instead, the subtokens 510-515 include data corresponding to the token 505 (or data usable to find the data of the token 505) but the subtokens 510-515 are not actually combined to form a monolithic chunk of data that includes the fields of the token 505. Likewise, in this implementation, the token 505 is not first created and then divided into the subtokens 510-515. The larger token 505 is referred to as a virtual offload token because it does not exist physically and independently of the subtokens 510-515 but exists virtually in the data of the subtokens 510-515. It is to be understood that when the token 505 is described herein that both implementations are contemplated.

Figure 6:
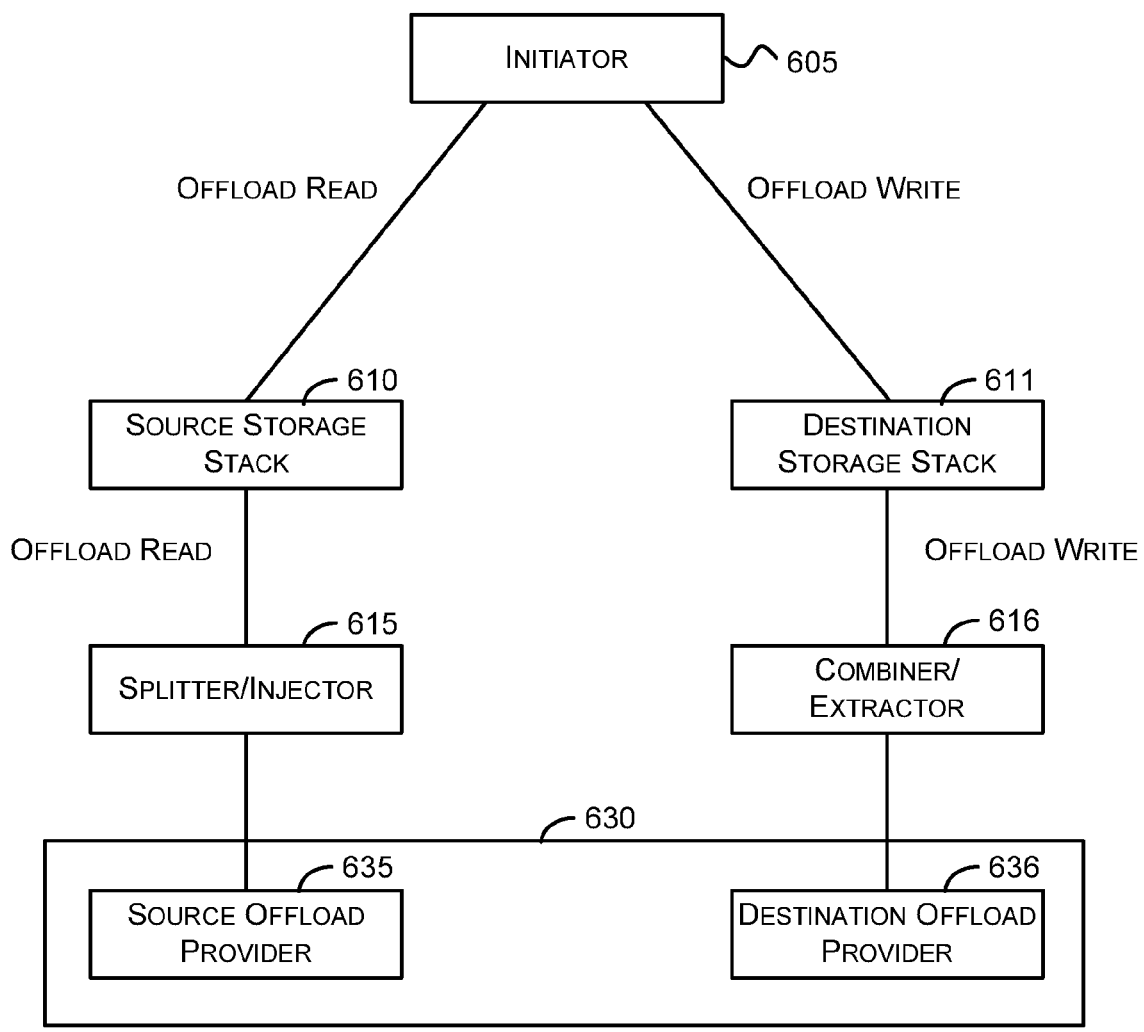
FIG. 6 is a block diagram that represents an exemplary arrangement of components of a system in which aspects of the subject matter described herein may operate.

FIG. 6 is a block diagram that represents an exemplary arrangement of components of a system in which aspects of the subject matter described herein may operate. As illustrated, the system includes an initiator 605, a source storage stack 610, a destination storage stack 611, a spittler/injector 615, a combiner/extractor 616, and an offload provider 630.

The offload provider 630 as illustrated is separated into a source offload provider 635 and a destination offload provider 636 to indicate that components of the offload provider 630 may be on different machines that communicate with each other to perform the functions of the offload provider 630. In another example, however, the source offload provider 635 and the destination offload provider 636 may be merged and placed on a single computer. In one implementation, the source offload provider 635 and the destination offload provider 636 are different offload providers altogether that may negotiate the transmission of offload data in response to an offload write command.

The initiator 605 initiates an offload read or write. In one example, the initiator 605 may be separated into a source initiator and destination initiator (as illustrated in FIG. 4) where the source initiator initiates an offload read and obtains multiple subtokens in response thereto and then provides the subtokens to the destination initiator which later initiates an offload write. In another example, the initiator 605 may directly initiate both the offload read and the offload write.

It is to be understood that an offload write is an offload write regardless of form. For example, forwarding a token to a different machine that in turn issues an offload write is really just a different way for an offload read initiator to initiate on offload write.

The source storage stack 610 and the destination storage stack 611 may each be implemented by one or more components arranged in layers where each layer may perform a different function.

The spittler/injector 615 may include one or more components. The spittler/injector 615 may receive an offload read command from the source storage stack 610. In response, the spittler/injector 615 may send an offload read command to the source offload provider 635. In response to the offload read command, the source offload provider 635 may provide a large token. After receiving the large token, the spittler/injector 615 may split the token into a plurality of smaller tokens and provide these smaller tokens to the source storage stack 610. The subtokens may, for example, be of a fixed standardized size as mentioned previously.

In one implementation, an offload read command may include a number that indicates how many subtokens may be provided in response to the offload read. This number may originate from the initiator 605 or a component of the source storage stack 610.

If the spittler/injector 615 determines that the number is large enough, the spittler/injector 615 may provide the subtokens as requested by the source storage stack 610. Otherwise, in one example, the spittler/injector 615 may return a message that indicates how many subtokens are needed to respond to the offload read request. In another example, the spittler/injector 615 may return an error that indicates that the number is not large enough and may allow the initiator 605 to try a larger number(s) if the initiator 605 determines to do so.

In another implementation, an offload read command may omit a number that indicates how many subtokens may be provided in response to the offload read. In this implementation, the component sending the offload read command may request subtokens until the spittler/injector 615 indicates that all subtokens for the offload read command have been provided.

In another implementation, the spittler/injector 615 may indicate a number of subtokens that were generated in response to the offload read command. The component that sent the offload read command may then be responsible for obtaining the subtokens from the spittler/injector 615.

In an offload write command with multiple subtokens, the initiator 605 may send the subtokens to the destination storage stack 611 which may send the subtokens to the combiner/extractor 616. The combiner/extractor 616 may then combine the subtokens into a single large token and provide the single large token to the destination offload provider 636.

The subtokens may be provided in a single message or in multiple messages depending on implementation.

In one implementation, the spittler/injector 615 may be combined with the source offload provider 635 and the combiner/extractor 616 may be combined with the destination offload provider 636. In at least this implementation, the spittler/injector 615 may inject data of a virtual offload token into the subtokens while the combiner/extractor 616 may extract the data from the subtokens without the larger token ever existing as a physical data structure.

Figure 7:
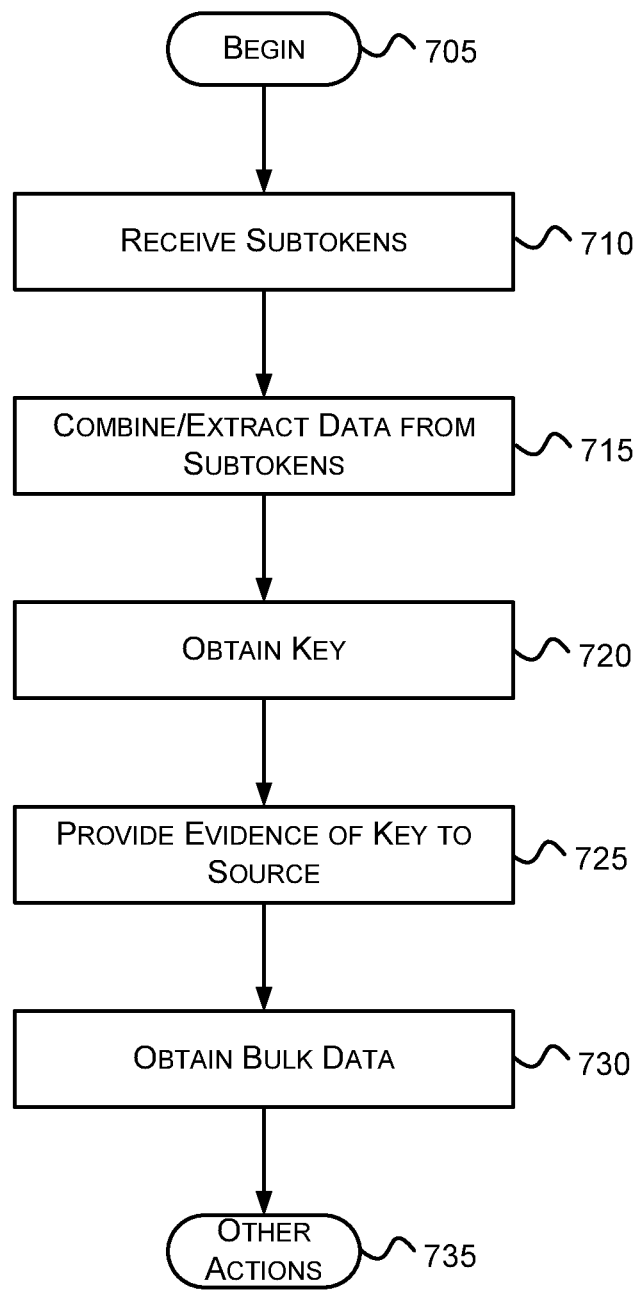
FIGS. 7-9 are flow diagrams that generally represent exemplary actions that may occur in accordance with aspects of the subject matter described herein
Figure 8:
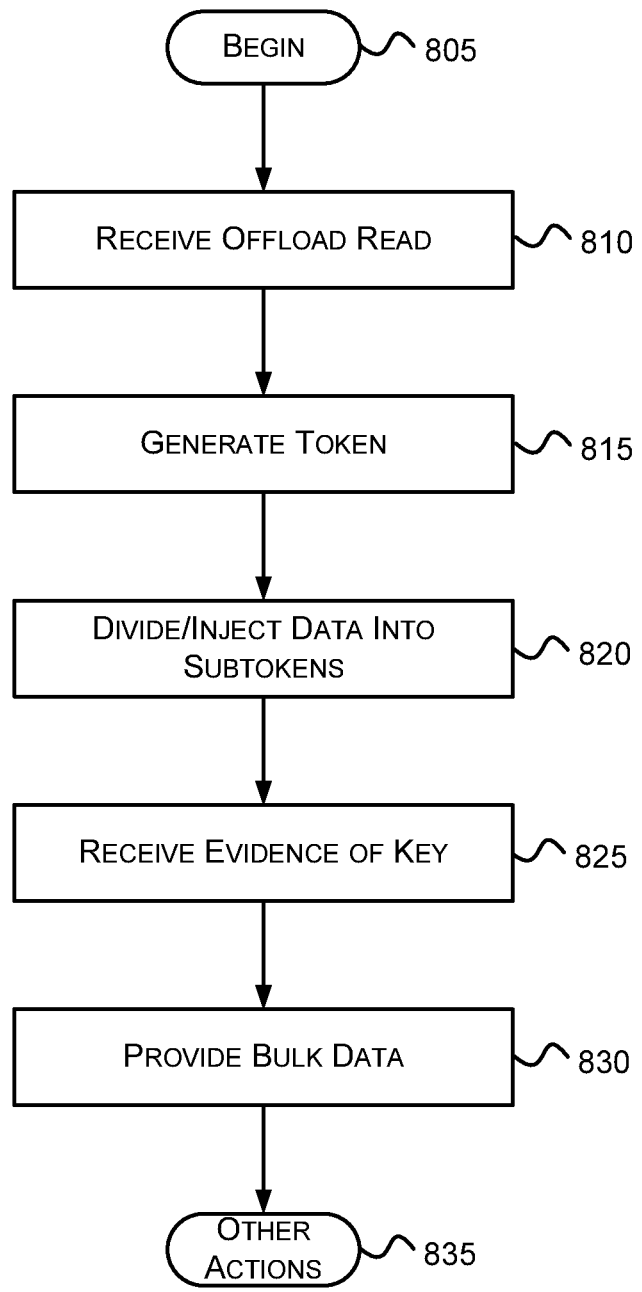
Figure 9:
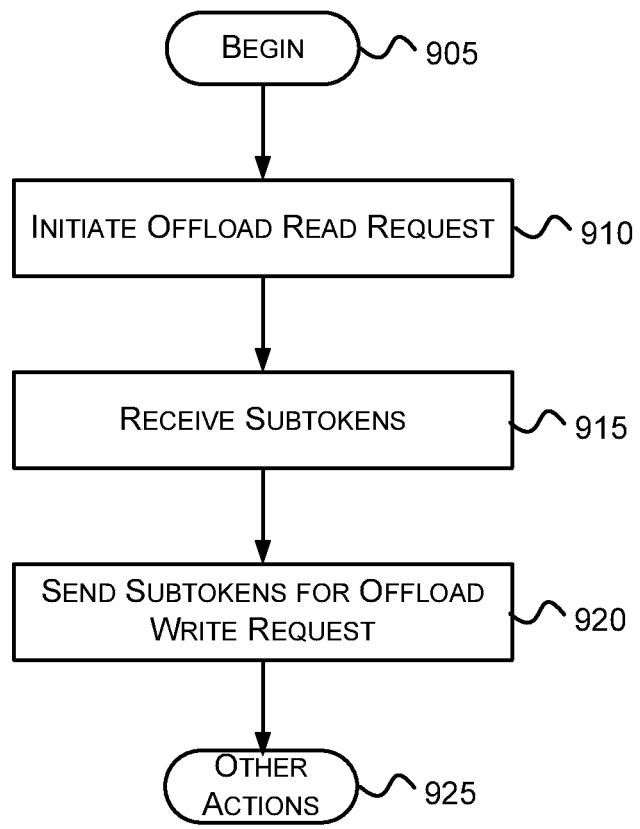

FIGS. 7-9 are flow diagrams that generally represent exemplary actions that may occur in accordance with aspects of the subject matter described herein. For simplicity of explanation, the methodology described in conjunction with FIGS. 7-9 is depicted and described as a series of acts. It is to be understood and appreciated that aspects of the subject matter described herein are not limited by the acts illustrated and/or by the order of acts. In one embodiment, the acts occur in an order as described below. In other embodiments, however, the acts may occur in parallel, in another order, and/or with other acts not presented and described herein. Furthermore, not all illustrated acts may be required to implement the methodology in accordance with aspects of the subject matter described herein. In addition, those skilled in the art will understand and appreciate that the methodology could alternatively be represented as a series of interrelated states via a state diagram or as events.

FIG. 7 is a flow diagram that generally represents exemplary actions that may occur at a destination offload provider in accordance with aspects of the subject matter described herein. At block 705, the actions begin.

At block 710, a message is received that indicates that two or more subtokens represent a larger token. The subtokens are each of a fixed size (e.g., a size specified by a standard). The larger token has a size larger than the fixed size. This means that the data included in the larger token is more than can fit into one of the subtokens. The data corresponding to the larger token is maintained by an offload provider. The data may be maintained in a single data structure corresponding to the larger token or in multiple data structures (e.g., that are not combined). The larger token represents data that is immutable as long as the data is larger token is valid.

For example, referring to FIG. 6, the combiner/extractor 616 may receive subtokens from the destination storage stack 611. The subtokens may be provided by the initiator 605 in conjunction with an offload write directed to the destination storage stack 611.

At block 715, data is extracted from the subtokens. Extracting data may include, for example, combining the subtokens into a larger token prior to obtaining the data or obtaining the data from the subtokens without combining the subtokens into the larger token. For example, referring to FIG. 6, the combiner/extractor 616 may combine/extract data from the subtokens. For example, some of the data extracted may include a number that associates the token with the data the token represents. This number is sometimes referred to as a key.

At block 720, the key is obtained from one or more of the subtokens. For example, referring to FIG. 6, after the combiner/extractor 616 combines the subtokens to form a larger token, the destination offload provider 636 may obtain the key from the larger token. As another example, without physically combining the data of the subtokens, the combiner/extractor 616 may extract the key from a virtual token (e.g., one or more of the subtokens) without physically combining all the data of the subtokens.

At block 725, evidence of the key is provided to a component of the offload provider. Using the evidence, the key may be validated as part of the actions of block 725 or as a separate set of actions. Providing evidence of the key may include, for example:

1. Providing the key itself;
2. Providing the key and other data (one or more fields) of the larger token;
3. Providing a digest (e.g., a hash function) of the key;
4. Providing a digest derived from the key and other data (one or more fields) of the larger token; or
5. Providing other evidence of the key and/or larger token.

FIG. 8 is a flow diagram that generally represents exemplary actions that may occur at a source offload provider in accordance with aspects of the subject matter described herein. At block 805, the actions begin.

At block 810, an offload read request is received. For example, referring to FIG. 6, the source offload provider 635 receives an offload read request initiated by the initiator 605.

At block 815, in response to the offload read message, a key is generated to return in response to the offload read message. The key in placed in a token (physical or virtual), the data of which will be placed into subtokens to return in response to the offload read message. For example, referring to FIG. 6, the source offload provider 635 may generate a token that includes the key.

At block 820, the data of the token is divided/injected into subtokens. For example, referring to FIG. 6, the splitter/injector 615 takes the data from the token generated at block 815 and splits/injects the data into subtokens that are provided to the source storage stack 610 for delivery to the initiator 605.

At block 825, evidence of the key is received. For example, referring to FIG. 6, a component of the source offload provider 635 receives evidence of the key. In one example, this evidence may be received as the offload provider 630 obtains the key from the subtokens received from the combiner/extractor 616. In another example, a component of the offload provider at a destination of an offload write (e.g., the destination offload provider 636) may obtain the key included in the subtokens, read an address contained therein, use the address to contact a component (e.g., the source offload provider 635) of the offload provider that generated the key, and provide the key to the component. In another example, a destination offload provider that is a different offload provider from the source offload provider may receive the key and addressing information, contact the source offload provider, and provide the key. Using the evidence, the key may be validated as part of the actions of block 825 or as a separate set of actions.

At block 830, bulk data corresponding to the token is provided. For example, referring to FIG. 6, the source offload provider 635 may provide a portion or all of the bulk data corresponding to the token to the destination offload provider 636.

At block 835, other actions, if any, may be performed.

FIG. 9 is a flow diagram that generally represents exemplary actions that may occur at an offload initiator in accordance with aspects of the subject matter described herein. At block 905, the actions begin.

At block 910, an offload read request is initiated by communicating with a component of a source storage stack. For example, referring to FIG. 6, the initiator 605 may send an offload read request to the source storage stack 610. In conjunction with the offload read request, a number may be send that indicates a maximum number of subtokens that are allowed to be returned in response to the offload read request.

At block 915, in response to the message, subtokens are received. The subtokens represent a token (physical or virtual) that is larger than any of the subtokens individually. The larger token represents data that is immutable as long as the larger token is valid. For example, referring to FIG. 6, in response to the offload read request, the initiator receives multiple subtokens. In conjunction with receiving the subtokens, a number may be received that indicates how many subtokens were generated in response to the offload read request.

At block 920, the initiator provides the subtokens to a component of a destination storage stack. For example, referring to FIG. 6, the initiator 605 provides the subtokens to a component of the destination storage stack 611.

At block 925, other actions, if any, may be performed.

As can be seen from the foregoing detailed description, aspects have been described related to offload technology. While aspects of the subject matter described herein are susceptible to various modifications and alternative constructions, certain illustrated embodiments thereof are shown in the drawings and have been described above in detail. It should be understood, however, that there is no intention to limit aspects of the claimed subject matter to the specific forms disclosed, but on the contrary, the intention is to cover all modifications, alternative constructions, and equivalents falling within the spirit and scope of various aspects of the subject matter described herein.

What is claimed is:

1. A method performed on a computing device that includes at least one processor and memory, the method comprising:
   receiving, by the computing device, two or more subtokens, each of a fixed size, the subtokens together representing a larger token of a size larger than the fixed size, the larger token representing data that is immutable as long as the larger token is valid;
   obtaining, by the computing device from one or more of the subtokens, a cryptographically secure key and information that identifies a source from which the data represented by the lamer token is obtainable; and
   providing, by the computing device to an offload provider that comprises at least one other computing device that is separate from the computing device, evidence of the key to obtain a portion of the data represented by the larger token without the portion of the data passing through an initiator that provided the subtokens.

2. The method of claim 1, further comprising obtaining information additional to the addressing information from the one or more of the subtokens.

3. The method of claim 1, further comprising combining data from the two or more subtokens to create the larger token, the two or more subtokens including at least all data included in the larger token.

4. The method of claim 1, where the providing the evidence of the key comprises providing the key.

5. The method of claim 1, where the providing the evidence of the key comprises providing a digest of the key.

6. The method of claim 1, where the providing the evidence of the key comprises providing a digest derived from the key and other data of the larger token.

7. The method of claim 1, where the larger token comprises a virtual token that is represented by data of the subtokens.

8. The method of claim 1, where the subtokens are each exactly 512 bytes, or where one or more of the subtokens includes a field required by a standard, the field identifying a representation of data token type.

9. The method of claim 1, where the subtokens are transmitted via a file sharing protocol that transfers file data via server message blocks.

10. The method of claim 1, where the subtokens are transmitted via a distributed file system protocol that accesses files via remote procedure calls.

11. A system comprising:
    a computing device that includes at least one processor and memory; and
    at least one program module that, based on execution by the at least one processor, configures the computing device to receive an offload read message initiated by an initiator;
    generate in response to the received offload read message, a cryptographically secure key; and
    provide, to a separate computing device, subtokens, each of a fixed size, the subtokens representing a larger token of a size larger than the fixed size data corresponding to the larger token maintained by an offload provider, the subtokens comprising information that identifies a source from which the data represented by the lamer token is obtainable, the larger token representing data that is immutable as long as the larger token is valid, the larger token including the cryptographically secure key.

12. The system of claim 11, where the larger token is a physical token and wherein splitter/injector splits a physical token into the subtokens.

13. The system of claim 11, where the larger token is a virtual token that is embodied in the subtokens but that is not embodied as a single token separate from the subtokens, and where portions of the virtual token are injected into the subtokens.

14. The system of claim 11, the computing device further configured to receive an offload write message that includes data corresponding to the subtokens.

15. At least one hardware computer storage medium having computer-executable instructions that, based on execution by at least one processor of at least one computing device that include at least one memory, configure the computing device to perform actions, comprising:

initiating, by the at least one computing device, an offload read request by communicating with a component of a source storage stack;

receiving, by the at least one computing device from at least one separate computing device in response to the offload read request, subtokens, the subtokens representing a larger token that is larger than any of the subtokens individually, the larger token representing data that is immutable as long as the larger token is valid, where the received subtokens comprise information that identifies a source from which the data represented by the lamer token is obtainable; and initiating, by the at least one computing device, an offload write request by providing the subtokens to a destination storage stack.

16. The at least one computer storage medium of claim 15, the actions further comprising: in conjunction with the offload read request, sending a number that indicates a maximum number of subtokens that are allowed to be returned in response to the offload read request.

17. The at least one computer storage medium of claim 15, the actions further comprising: in response to offload read request, receiving a number that indicates how many subtokens were generated in response to the offload read request.

* * * * *